United States Patent [19]

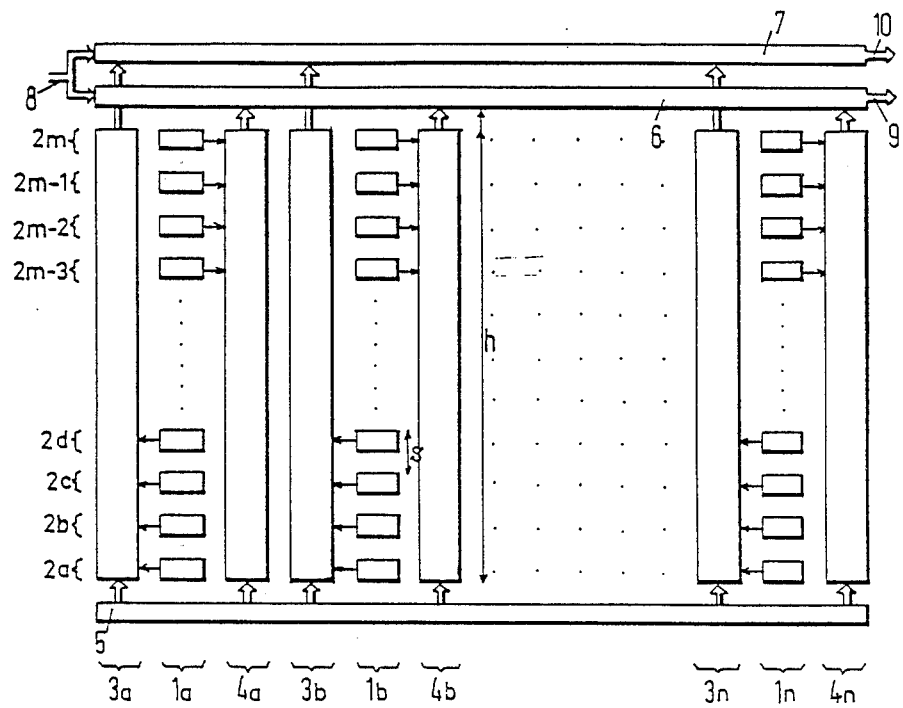

Mulder

[11] Patent Number: 4,948,977

[45] Date of Patent: Aug. 14, 1990

[54] IMAGE PICKUP DEVICE

[75] Inventor: Hendrik Mulder, Delft, Netherlands

[73] Assignee: B.V. Optische Industrie "De Oude Delft", Delft, Netherlands

[21] Appl. No.: 108,084

[22] Filed: Oct. 13, 1987

[30] Foreign Application Priority Data

Oct. 17, 1986 [NL] Netherlands ............... 8602616

[51] Int. Cl.$^5$ .................. H01L 27/148; H01L 31/115
[52] U.S. Cl. ..................... 250/370.09; 250/370.01; 250/370.08
[58] Field of Search ........... 250/338.4, 370.09, 370.01, 250/370.08, 332; 357/32

[56] References Cited

U.S. PATENT DOCUMENTS

| | | | |
|---|---|---|---|
| 3,869,572 | 3/1975 | Carter | 357/32 |
| 4,179,100 | 12/1979 | Sashin et al. | 378/22 |
| 4,383,327 | 5/1983 | Kruger | 378/22 |
| 4,455,575 | 6/1984 | Murakoshi | 358/213.18 |

FOREIGN PATENT DOCUMENTS 56-128075 10/1981 Japan.

OTHER PUBLICATIONS

J. Coumans, Dr. J. Kosanetzky and F. W. Zonneveld, "Computerized dual-energy imaging: a technical description", Medicamundi, vol. 27, No. 3 (1982), pp. 125-132.

Primary Examiner—Constantine Hannaher
Attorney, Agent, or Firm—Louis E. Marn

[57] ABSTRACT

An image pickup device comprises a matrix of rows and columns of image pickup elements. Image information is transferred in the column direction in the time-delay-and-integration mode. Two shift registers are associated with each column of image pickup elements. During a first period information from the image pickup elements of each column is transferred to a first one of each two shift registers associated with each column and during a second period information is transferred to the second one of each two shift registers associated with each column.

Such an image pickup device can be used in radiography as a means for detecting x-ray radiation transmitted by a body under examination. In order to obtain a dual energy image a first or a second spectral center point is periodically imparted to the x-ray radiation synchronously with the first and second periods.

8 Claims, 1 Drawing Sheet

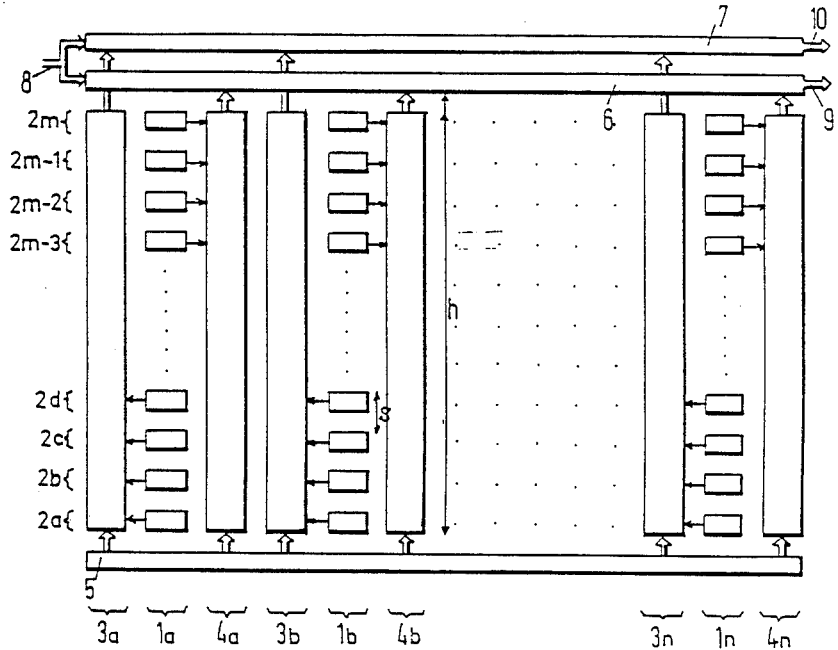

IMAGE PICKUP DEVICE

The invention relates to an image pickup device comprising a matrix having horizontal rows and vertical columns of image pickup elements, at least one vertical shift register associated with each column of image pickup elements, means for supplying clock signals to the matrix of image pickup elements and to the shift registers for transferring image information in the column direction in the time-delay-and-integration mode, and at least one horizontal shift register near the end of the vertical shift registers for reading out and transferring the image information.

In radiography the directing of a flat fan-shaped beam of x-ray radiation via a body under examination to an image pickup device consisting of a large number of image pickup elements situated in a line is known from the U.S. Pat. No. 4,179,100. In this case each image pickup element receives, optionally after further processing, the radiation which has been transmitted through a corresponding part of the body under examination. As further processing it is possible for the radiation to be converted into visible light in an x-ray detector, for example, before it is picked up by the image pickup device. In the case of an image pickup device consisting of a large number of image pickup element, situated in a line and having, for example, dimensions of 0.1×0.1 mm, the exposure time for each image pickup element is extremely short for the usual scanning speeds of a body under examination. As a result, the signal/noise ratio of the image obtained is very poor or the source loading has to be raised to undesirably high levels to achieve a better signal/noise ratio. In order, nevertheless, to obtain an acceptable signal/noise ratio for a relatively low source loading, it is necessary to use the x-ray source more efficiently than is possible with a fan-shaped beam which has only a thickness of the size of one image pickup element.

Making use of an image pickup device comprising a matrix having rows and columns of image pickup elements, the charge of which is formed during a certain period in a certain pickup element as a result of the radiation received by said element during said period, being transferred during a reading period to an adjacent associated vertical shift register, is known from the U.S. Pat. No. 4,383,327. This takes place during the reading period for all the image pickup elements in each row. A relative movement between the body and the image pickup device is also brought about between the consecutive periods so that the same part of the body under examination is imaged on the next row of image pickup elements during the subsequent period. The charge in the shift register tracks so that in this manner, during consecutive periods, a charge is accumulated by consecutive image pickup elements in a column in the associated-shift register. The accumulated charge is the sum of the charge which is transmitted through a specific part (an image point) of the body under examination during the consecutive periods.

This method of scanning is termed TDI (time delay and integration) and appears to be particularly well suited for use in the examination of bodies by means of x-ray radiation, it being possible for a usable image to be formed in spite of the fact that each image pickup element per se generates only a very small quantity of charge in response to the radiation received. For a comprehensive discussion of the TDI principle, reference is made to the U.S. Pat. No. 4,383,327.

Generating so-called dual-energy x-ray images by alternately applying two different high-voltage values, for example 70 $kV_p$ and 130 $kV_p$ to an x-ray radiation source, the respective high-voltage values generating x-ray spectra with different energy centre points, often termed a different hardness, is known from the article entitled "Computerized dual-energy imaging: a technical description" by J. Coumans et al. in Medicamundi, Vol. 27, no. 3, 1982. By irradiating a body under examination successively with x-ray radiation having a first energy centre point and then with x-ray radiation having a second energy centre point, it is possible to process the x-ray images obtained, for example, by means of a computer, so that bones in the human body are not imaged and tissue is, as a result of which it is possible to image tissue parts situated behind, for example, ribs, considerably more clearly. All this is based on the fact that different materials in, for example, the human body, have a different absorption for x-ray radiation having a different hardness.

In addition to obtaining different x-ray radiation energies by means of switching the supply voltage of the x-ray radiation source, it is also possible to obtain from an x-ray radiation source driven with one single supply voltage source different radiation energies by filtering the x-ray radiation beam radiated by the source before it reaches the body to be irradiated. By optionally causing this filtering to take place alternately, a beam of x-ray radiation can be obtained having alternately a first and a second x-ray radiation energy.

The object of the invention is to make an image pickup device which operates according to the above described TDI principle suitable for processing x-ray images which are simultaneously obtained by means of two x-ray radiation energies.

For this purpose the invention provides an image pickup device of the abovementioned type in which two vertical shift registers are associated with each column of image pickup elements and in which means are provided for always transferring the information from the image pickup elements to the first vertical shift register associated with each column during a first period and to the second vertical shift register associated with each column during a second period.

According to a preferred embodiment two horizontal shift registers are provided for reading out and transferring the image information, of which the first always receives the information from the first shift register associated with each column of image pickup elements and the second always receives the information from the second shift register associated with each column of image pickup elements.

Although the invention is suitable, in particular, for simultaneously processing two x-ray images obtained with different x-ray radiation energies, attention is emphatically drawn to the fact that the invention is certainly not restricted to use in radiography. The invention is capable of being used in all those cases in which images are obtained alternately with different spectral regions, which images are scanned in the TDI mode. In this connection, said different spectral regions may be situated in the region of the x-ray radiation but also in the region of visible or infra-red light. The separation into different spectral regions may in these cases also take place in the region of visible or infrared light, for example, by means of filtering.

The invention will be explained below in more detail on the basis of an exemplary embodiment with reference to the drawing, in which the FIG. shows a diagrammatic plan view of an image pickup device according to the invention which is designed to work on the TDI principle.

The device comprises m rows, $2a$-$2m$ respectively, of image pickup elements and n columns, $1a$-$1n$ respectively of image pickup elements. The image pickup device therefore consists of m x n image pickup elements. For the sake of the clarity of the perception underlying the invention to be described below, it will be assumed that the height of an image pickup element augmented by the distance between two adjacent image pickup elements in one column is s and that the total height of a column of image pickup elements is h.

It is therefore now the case for m image pickup elements in a column that h=ms. If the scanning speed, i.e. the difference in speed between the image pickup device and the body to be irradiated, is v, the imaging of said body according to the TDI principle is correct if the frequency of the clock signals $f_{TDI}$= v/s=mv/h. In this case the fact is left out of consideration that the known use of a multiphase clock implies per se a higher frequency, but this is not relevant for the understanding of the present invention.

The body is now irradiated alternately with hard and soft x-ray radiation in order to obtain an x-ray image having two radiation energies. This takes place with a repetition frequency $f_{hz}$=kv/h, where k=1,2,3 . . . If the hard and the soft radiation are each present for an equally long time in a period of h/kv, then every image point of the body to be irradiated is. imaged on half (m/2) the number of image pickup elements in a column with hard x-ray irradiation and on the other half of the image pickup elements in the same column with soft x-ray radiation. If the hard and the soft x-ray radiation are each present for a time which is not equally long in a period h/kv, then each image point of the body to be irradiated is imaged on a larger or smaller number respectively than half of the number of image pickup elements in a column with hard x-ray radiation and on a smaller or larger number respectively than half of the image pickup elements in the same column with soft x-ray radiation. This applies, of course, for all the corresponding image pickup elements in the n columns. There is a fixed relationship $f_{hz/fTDI}$=k/m between the clock frequency and the repetition frequency of the x-ray radiation hardness. If, for example, m=64, s=0.1 mm and v=400 mm/sec, then it holds true that $f_{TDI}$=4 kHz and for k=1, $f_{hz}$=62.5 Hz.

According to the invention, adjacent to each column of image pickup elements there is provided in each case a first vertical shift register $3a$-$3n$ respectively and in each case a second vertical shift register $4a$-$4n$ respectively. Clock signals are fed via a bus 5 to the shift registers $3a$-$3n$ and $4a$-$4n$ in a manner known per se for transferring the image information in the vertical direction which is received by each shift register from the associated column of image pickup elements.

Each of the m image pickup elements in a particular column, for example column $1a$, can be coupled, under the control of two readout port electrodes (not shown) to either the first or the second associated shift register $3a$ or $4a$. Said gate electrodes receive clock signals via the bus 5 for optionally transferring charge from an image pickup element to a shift register. In addition, however, a clock signal is provided which runs synchronously with the alternating frequency for switching between the two x-ray radiation energies, which clock signal also controls the readout gate electrodes of all the image pickup elements.

In this manner, the image information from all the image pickup elements can be transferred during the period of the hard x-ray radiation to, for example, the respective shift registers $3a$-$3n$, and the image information from all the image pickup elements can be transferred during the period of soft x-ray. radiation to the respective shift registers $4a$-$4n$.

Consequently, the situation indicated in the FIGURE by arrows between the columns of image pickup elements $1a$-$1n$ and the associated vertical shift registers $3a$-$3n$ and $4a$-$4n$ arises during a single TDI cycle for a row of image points of a body to be irradiated. During the time the effected row of image points of the body receives hard x-ray radiation, the image information is transferred to the shift registers $3a$-$3n$ and during the time that the same row of image elements receives soft x-ray radiation, it is transferred to the shift registers $4a$-$4n$.

At the end of a TDI cycle, the image information of a hard and a soft x-ray image of one row of image points of the body is therefore available at the end of, respectively, the shift registers $3a$-$3n$ and $4a$-$4n$ respectively. From this information it is possible to determine directly on the chip of the image pickup device a difference, possibly weighted, for each pair of vertical shift registers 3 and 4 by means of an analog circuit suitable for the purpose, which different signal from each column can then be read out by means of a single horizontal shift register and can be transferred to an output terminal for further processing of the signal.

Preferably, however, as shown in the FIGURE, two horizontal shift registers 6 and 7 are provided, to which clock pulse signals are fed via a bus 8. The shift register 7 is always coupled to the vertical shift registers $3a$–$n$ and the shift register 6 to the vertical shift registers $4a$–$n$. In this manner the information of a soft and a hard x-ray radiation image of the irradiated body is always available line by line at the output terminals 9 and 10 of, respectively, the shift registers 6 and 7, which information can be processed further either on the chip of the image pickup device or outside thereof, optionally prior to the conversion thereof into digital form.

I claim:

1. Image pickup device comprising a matrix having horizontal rows and vertical columns of image pickup elements, at least two vertical shift registers associated with each column of image pickup elements, means for supplying clock signals to said matrix of image pickup elements and to shift registers for transferring image information in column direction in time-delay-and-integration mode, and at least one horizontal shift register near an end of said vertical shift registers for reading out and transferring image information, characterized by two vertical shift registers being associated with each column of image pickup elements and means for transferring the information from said image pickup elements to a first vertical shift register associated with each column during a first period and to a second vertical register associated with each column during a second period.

2. Image pickup device according to claim 1, characterized in that two horizontal shift registers are provided for reading out and transferring image information and wherein a first horizontal shift register receives information from said first vertical shift register associated with each column of image pickup elements and a second horizontal shift register receives information from said second vertical shift register associated with each column of image pickup elements.

3. Image pickup device according to claim 2, characterized in that said two horizontal shift registers are situated near an end of said columns.

4. Image pickup device according to claim 1, 2 or 3 characterized in that the ratio between repetition frequency ($f_{TDI}$) of transfer of image information in said time-delay-and-integration mode and frequency ($f_{hz}$) with which image information is transferred either to said first or to said second horizontal shift register is given by $f_{hz}/f_{TDI}=k/m$, where $k=1, 2, 3\ldots$, and m is the number of image pickup elements in a column.

5. Device for forming an x-ray image of a body under examination which comprises: an x-ray radiation source, means for periodically imparting a first or second spectral centre point to an x-ray radiation beam radiated by said x-ray radiation source, means for detecting x-ray radiation transmitted by the body including an image pickup device comprising a matrix having horizontal rows and vertical columns of image pickup elements, at least two vertical shift registers associated with each column of image pickup elements, means for supplying clock signals to said matrix of image pickup elements and to shift registers for transferring image information in column direction in time-delay-and-integration mode, at least one horizontal shift register near an end of said vertical shift registers for reading out and transferring image information, two vertical shift registers associated with each column of said image pickup elements and means for transferring information from said image pickup elements to a first vertical shift register associated with each column during a first period and to a second vertical shift register associated with each column during a second period.

6. A device for forming an x-ray according to claim 5, characterized in that two horizontal shift registers are provided for reading out and transferring image information and wherein a first horizontal shift register receives information from said first vertical shift register associated with each column of image pickup elements and a second horizontal shift register receives information from said second vertical shift register associated with each column of image pickup elements.

7. A device for forming an x-ray image according to claim 6, characterized in that said two horizontal shift registers are situated near an end of said columns.

8. A device for forming an x-ray image according to claim 5, 6 or 7, characterized in that the ratio between repetition frequency ($f_{TDI}$) of transfer of image information in said time-delay-and-integration mode and frequency ($f_{hz}$) with which image information is transferred either to said first or to said second horizontal shift register is given by $f_{hz}/f_{TDI}=k/m$, where $k=1, 2, 3\ldots$, and m is the number of image pickup elements in a column.

* * * * *